United States Patent
Khoshnevisan et al.

(10) Patent No.: US 6,320,707 B1
(45) Date of Patent: Nov. 20, 2001

(54) MINIATURE PIEZOELECTRIC TRANSLATORS FOR OPTICAL APPLICATIONS

(75) Inventors: Mohsen Khoshnevisan; Manouchehr E. Motamedi, both of Newbury Park; Jeffrey Glenn Nelson, Camrillo; Ratnakar R. Neurgaonkar, Thousand Oaks, all of CA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/484,831

(22) Filed: Jan. 18, 2000

(51) Int. Cl.[7] .................................................. G02B 7/02
(52) U.S. Cl. ............................................................ 359/824
(58) Field of Search .................................. 359/814, 824, 359/822; 369/44.15

(56) References Cited

U.S. PATENT DOCUMENTS

| | | | |
|---|---|---|---|
| 4,193,001 | * 3/1980 | Kleuters et al. | 358/128.5 |
| 4,211,139 | * 7/1980 | Murakami | 84/731 |
| 4,601,539 | 7/1986 | Watanabe | 359/824 |
| 4,905,031 | 2/1990 | Mody | 396/133 |
| 5,490,015 | 2/1996 | Umeyama et al. | 359/824 |
| 5,521,764 | 5/1996 | Balogh et al. | 359/824 |
| 5,576,894 | 11/1996 | Kuwana et al. | 359/701 |
| 5,675,444 | 10/1997 | Ueyama et al. | 359/824 |
| 5,768,038 | 6/1998 | Emura | 359/824 |
| 5,771,095 | 6/1998 | Prikryl et al. | 356/521 |

* cited by examiner

Primary Examiner—Ricky Mack
(74) Attorney, Agent, or Firm—Harness Dickey & Pierce P.L.C.

(57) ABSTRACT

A piezoelectric translator has a flat ribbon geometry and a large translation length perpendicular to the surface of the bridge. The translator includes a platform supporting the optic or micro-optic element and a slender piezo actuation system for displacing the platform. A position sensing system provides feedback to the actuation system regarding displacement of the platform. The actuation system includes a plurality of bridge actuators wherein each actuator includes a flat piezoelectric ribbon and leaf spring cap bonded to the ribbon, in single- or double-sided geometry. A stacked bridge geometry is also provided and allows increased displacement for a given applied voltage. Two collinearly placed single span bridge actuators or two-span bridge actuators can be used to provide linear translations with micro-rotation control.

18 Claims, 10 Drawing Sheets

MINIATURE PIEZOELECTRIC TRANSLATORS FOR OPTICAL APPLICATIONS

TECHNICAL FIELD

The present invention relates generally to lightweight optics, including micro-optics and fiber optics translation. More particularly, the invention relates to a piezoelectric translator having a bridge geometry and a relatively large translation length.

BACKGROUND OF THE INVENTION

Background Art

Modern day aircraft and spacecraft, and particularly modern day military platforms, typically make use of a large number of optical components. Due to the physical characteristics of light, most electro-optical applications require alignment between one or more optical components. For example, the most basic function of launching light into an optical fiber requires alignment of the fiber with the light source. Typically, the light source will be a laser and the application will require high accuracy beam pointing. Such a configuration is commonly used in applications such as optical scanners, laser designators or projector systems. Another type of application involves the positioning of microlens arrays, which typically need to be moved for tens to hundreds of microns in one or two dimensions. Movement in such small proportions is termed "translation" in the optics industry and is the subject of much attention. Other applications include laser communications, laser radar and optical steering for unmanned airborne vehicles.

Conventional approaches to translating optical elements have employed piezo rod actuators to provide the required displacement. Rod actuators, however, are heavy, large, non-planar and bulky. These limitations have hindered the development of optical systems for airborne and space applications as well as other electro-optical systems requiring compactness and a large translation length. Translation length is defined by the amount of displacement achievable for a given voltage and rod length. Thus, rod actuators require a relatively large rod length for very small translation lengths. Typically, translation lengths are on the order of one micron per millimeter of rod length for applied fields of about 20 kV/cm.

Translation length is also affected by the weight of the optical element being displaced. For example, a typical lens array can weigh as little as 80 grams. This relatively small weight does not require the force generated by rod actuators. It is therefore desirable to enable relatively large displacements of lightweight optical elements at higher speeds and in very compact actuation systems.

It would further be desirable to provide a method and device for providing relatively large displacement of a micro-optic element using a small voltage. It will be appreciated that power consumption is often just as critical to optical applications as size. Accordingly, a large translation length is needed.

It would also be highly desirable to provide a method and system having inherent mechanical amplification. Such a system would allow increased compactness and lower voltages. It would also be desirable to provide high accuracy feedback to increase the speed of actuation. Conventional rod actuators are sluggish due to their size, weight and feedback problems.

It will be understood that displacement on the order of tens of microns is significantly affected by environmental effects. For example, slight fluctuations in temperature can result in changes in material properties which cause a substantial amount of system noise. It is therefore highly desirable to provide a micro-optic translation system with temperature compensated designs and/or compact and effective environmental isolation.

SUMMARY OF THE INVENTION

The above and other objects are provided by a preferred piezoelectric translator and method for translating lightweight optical elements such as micro-optics, mini-optics, or fiber optics. The piezoelectric translator includes a platform supporting the optical element and a piezo bridge actuation system for displacing the platform. A position sensing system provides feedback to the actuation system regarding displacement of the platform. The actuation system includes a plurality of bridge actuators wherein each actuator includes a flat piezoelectric ribbon and a metal bridge, similar to a leaf spring, bonded to the ribbon, such that each actuator forms a piezoelectric bridge having a slender geometry. Single-, and double-span piezoelectric bridges can be constructed for effecting pure translation, pure rotation, or mixed translation and rotation. Moreover, double-sided piezoelectric bridges can be constructed which can substantially increase translation at a given applied voltage. Similarly, stacks of single and/or double-sided bridge actuators can be constructed to further increase the translation at relatively low voltages.

The method for translating a lightweight optical element includes the steps of supporting the optical element with a platform and displacing the platform with a piezo bridge actuation system. Feedback is provided to the actuation system based on displacement of the platform. Furthermore, a leaf spring cap is bonded to a flat piezoelectric ribbon and the combination forms a thin strip, nearly one-dimensional actuator in the form of a piezoelectric bridge. The actuator is disposed along a perimeter of the platform and actuated to provide positive linear displacement of the optical element along a first axis. A second bridge actuator may be used to provide push-pull actuation and a greater control of translation of the micro-optic element. An alternative method to push-pull actuation is to replace one of the bridge actuators with a spring mechanism. Similar actuators on adjacent sides will allow full two-dimensional actuation. Placement of bridge actuators between the frames that hold micro-optic arrays can allow three-dimensional actuation and add optical focus control. A specific arrangement of using two independent bridge actuators or a double-span bridge actuator on each side of the optical or micro-optical element will add the capability to control micro-rotations, in addition to pure translation.

BRIEF DESCRIPTION OF THE DRAWINGS

The various advantages of the present invention will become apparent to one skilled in the art by reading the following specification and sub-joined claims and by referencing the following drawings in which:

FIG. 4b is a top view of the piezo bridge actuator of FIG. 4a;

DETAILED DESCRIPTION OF THE PREFERRED EMBODIMENTS

Figure 1:
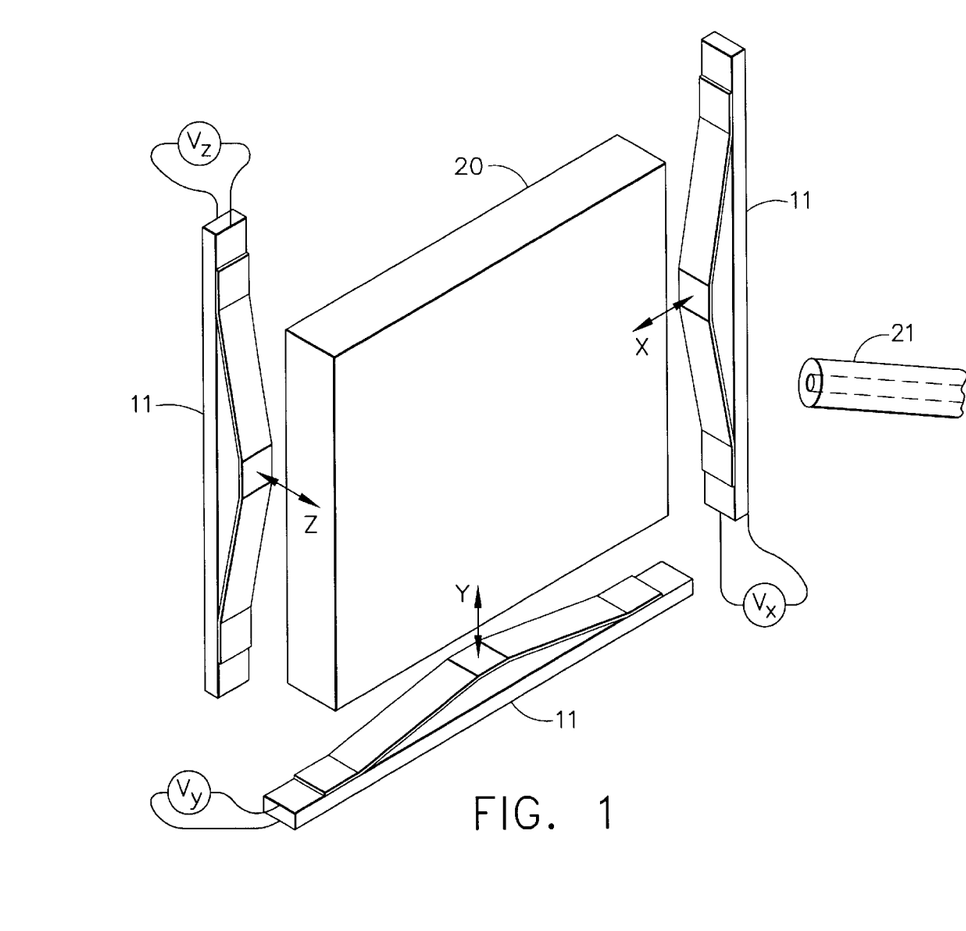
FIG. 1 is a perspective view of an optical element being translated in relation to a coupling element in accordance with a preferred embodiment of the present invention.

Referring to FIG. 1, translation of an optical lens array element 20 is shown as the optical element 20 relates to a coupling element 21. While the elements are shown as a lens array and an optical fiber, the present invention can be applied to LED's, photodetectors, lasers, microlens arrays, optical fiber or fiber optic bundles, and other lightweight optical components requiring translation. It will be appreciated that as light emanates from optical element 20 to coupling element 21, the need to translate one of the elements may arise. It will also be appreciated that light may similarly emanate from the coupling element 21 to the optical element 20. It is important to note that while additional alignment and coupling components are typically employed, translation on the order of tens to hundreds of microns may still be necessary. Thus, the present invention provides actuation of optical element 20 along any desired axis. The present invention also provides an actuation device with a nearly planar geometry, thereby significantly reducing size and costs associated with optical steering and other translation applications.

Figure 2:
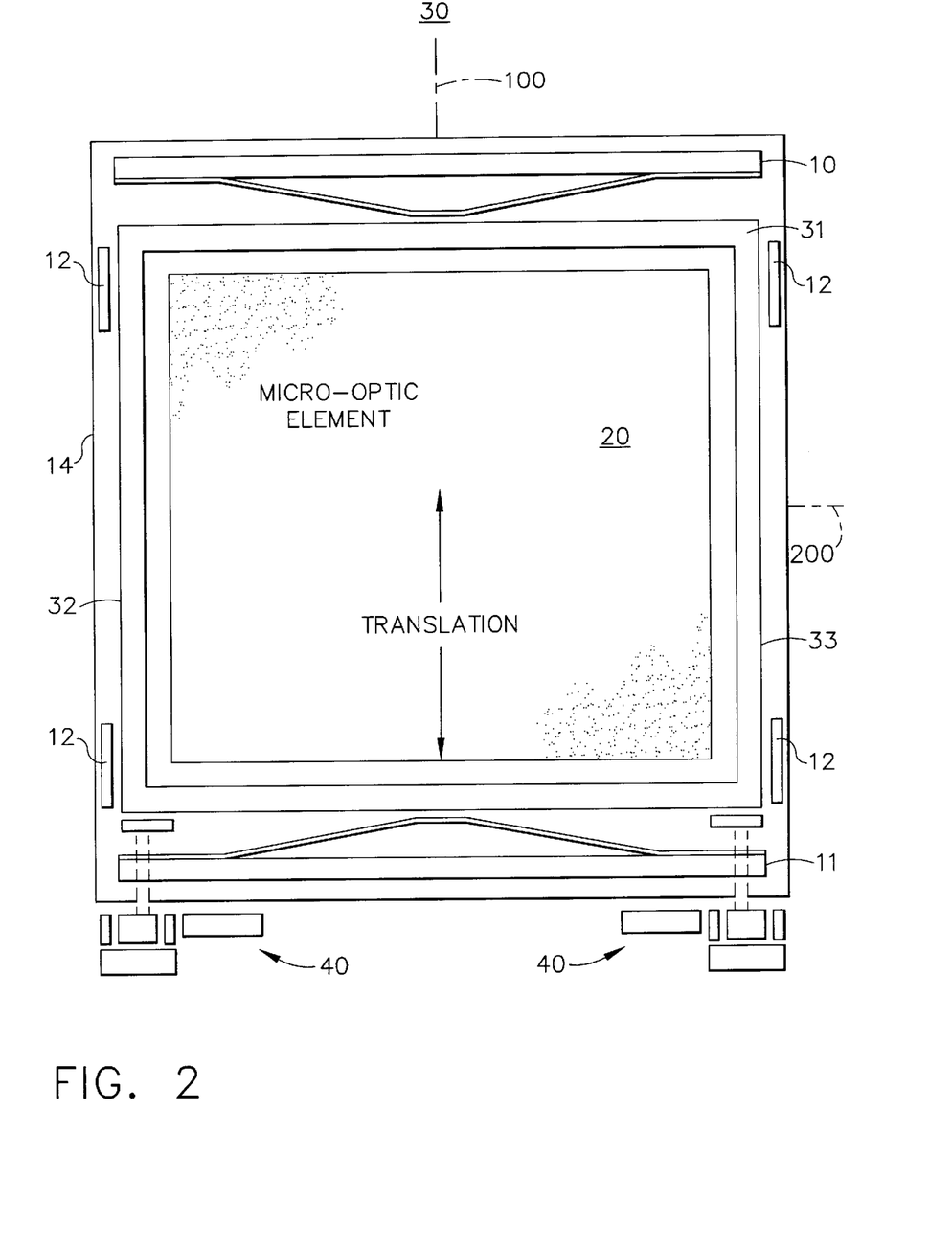
FIG. 2 is a top view of a piezoelectric translator in accordance with the preferred embodiment of the present invention.

Turning now to FIG. 2, a piezoelectric translator 30 for optical element 20 is shown in accordance with a preferred embodiment of the present invention. Generally, piezoelectric translator 30 includes a platform 31 supporting the optical element 20, a planar piezo actuation system for displacing the platform 31, and a position sensing system 40 providing feedback to the actuation system regarding displacement of the platform 31. It will be appreciated that the actuation system includes a plurality of bridge actuators 10 and 11 and is capable of translating the optical element 20 in one dimension. It will be further appreciated that disposition of bridge actuators 10 and 11 on opposing sides of optical element 20 allows push-pull actuation. The preferred embodiment therefore provides greater control through the use of a plurality of actuators.

Specifically, for downward movement of optical element 20, the first bridge actuator 10 provides positive linear displacement along a first axis 100. Similarly, the second bridge actuator 11 provides negative linear displacement along the first axis 100. The reverse is true for upward movement of optical element 20. Actuation is effected by a change in height of each actuator. As will be discussed in greater detail below, bridge actuators 10 and 11 are designed to maximize height change with respect to applied voltage and thereby achieve a large translation length.

A plurality of low friction spacers 12 are disposed along the perimeter of the platform 31 to serve as a means for aligning displacement of the optical element 20 with the first axis 100. Essentially, spacers 12 prevent twisting of the optical element 20 during translation. A temperature controlled housing 14 encloses the optical element 20, the platform 31 and the actuation system. The housing 14 has front and back apertures for allowing light to interact with the optical element 20. The position sensing system 40 preferably has a capacitative sensing mechanism for sensing coarse and/or fine displacement of the platform 31. Alternatively, interferometric sensing mechanism allows sensing of fine displacement. Thus, a nearly planar geometry is provided while at the same time allowing lightweight and relatively fast actuation with a large translation length.

Figure 4A:
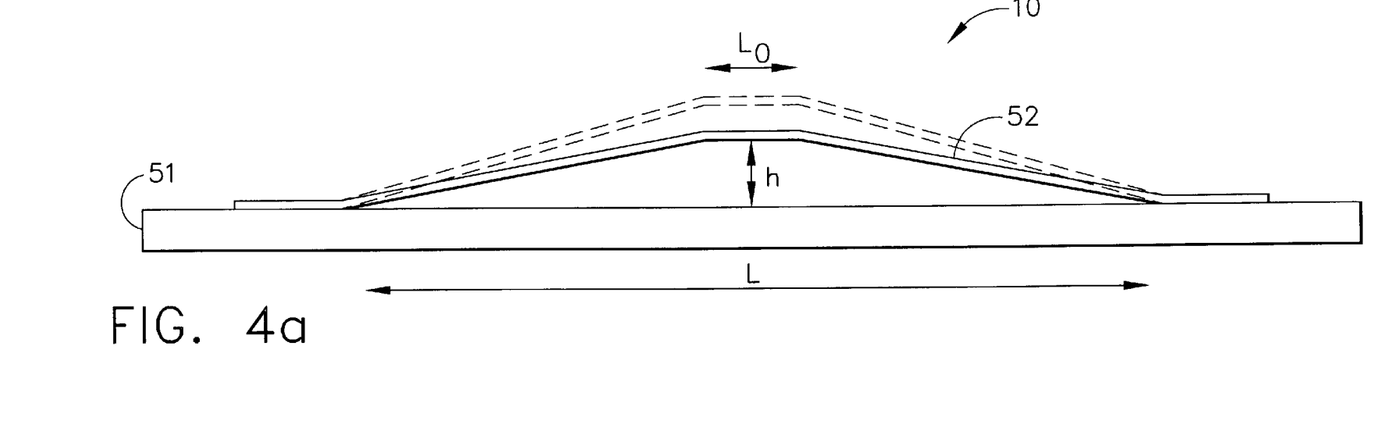
FIG. 4a is a side view of a piezo bridge actuator according to the present invention.
Figure 4B:
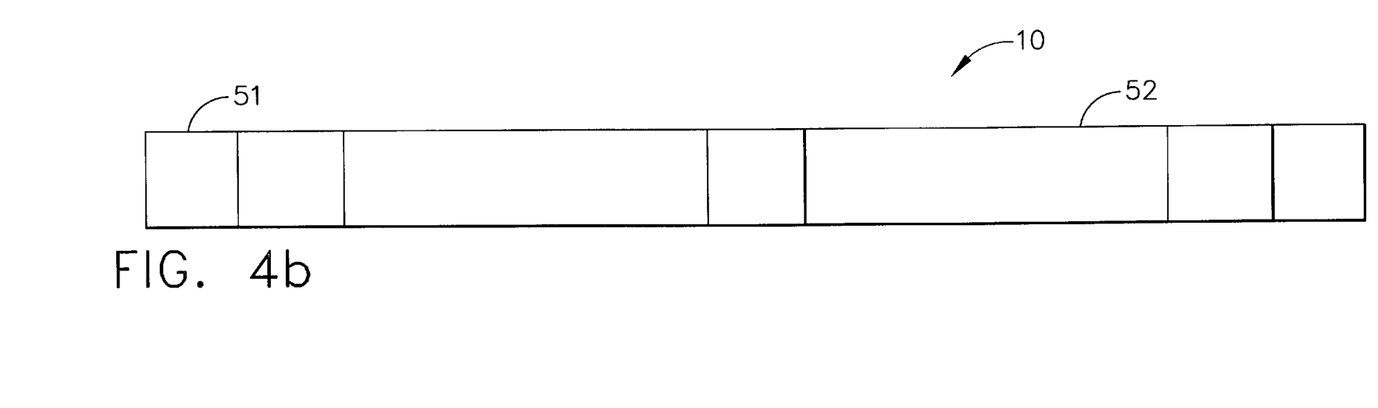
Figure 9:
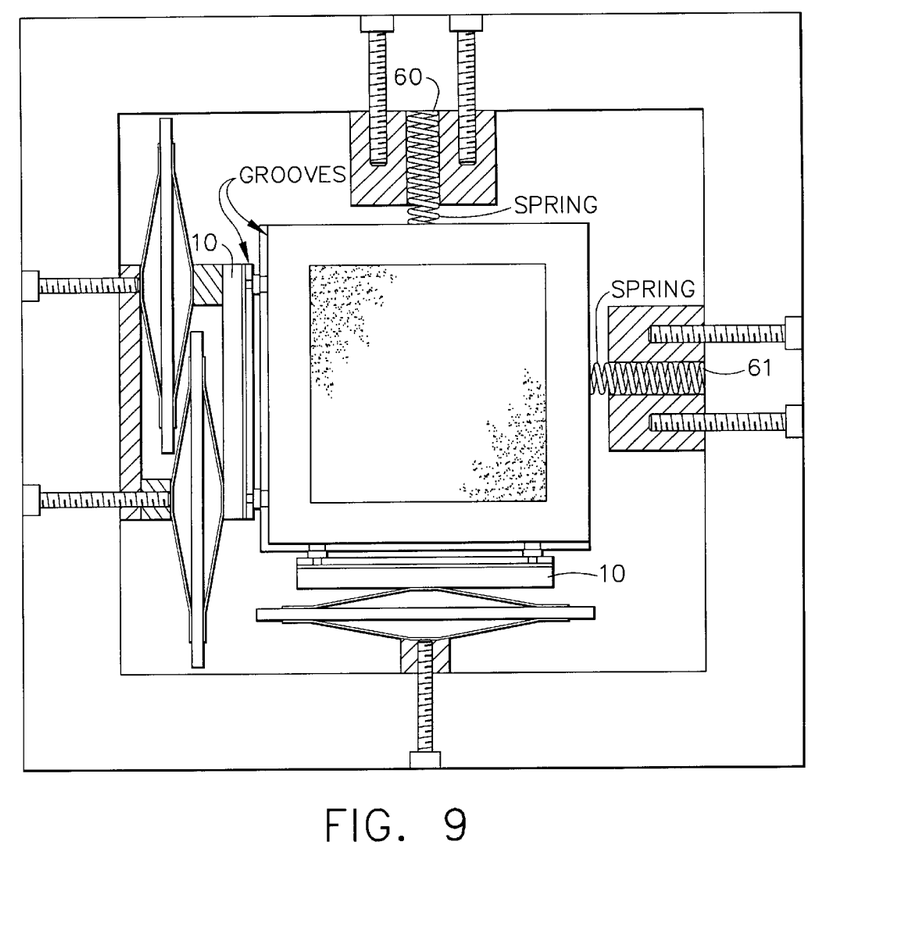
FIG. 9 is a top view of a piezoelectric translator using spring mechanisms in accordance with the present invention.

The bridge actuators 10 and 11 will now be described in greater detail. Turning to FIGS. 4a and 4b, the increased displacement capability and the bridge geometry provided by the present invention can be better appreciated. A bridge actuator approach is proposed for construction of a miniature, nearly one-dimensional translator capable of carrying a relatively lightweight optical component on the order of one or a few square inches in size. The bridge actuators are able to dither many tens to hundreds of microns, each in one dimension, orthogonal to the bridge long axis. A multiplicity of such actuators can produce precise one, two or three-dimensional translations for the optical elements. Bridge actuators are proposed here to provide inherent mechanical amplification. A single such actuator 10 can apply forces to micro-optic elements which can be spring loaded on the far side of the micro-optic element to provide a restoring force. For example, a two-dimensional actuation system using spring mechanisms 60 and 61 is shown in FIG. 9. As discussed above, in order to provide more control, the preferred embodiment proposes a push-pull configuration using two such bridge actuators to apply the electromechanical forces to the platform.

Returning now to FIG. 4a, it can be seen that a typical piezo bridge actuator 10 is formed from a piezoelectric (PLZT) ribbon 51 bonded to a leaf spring 52 made from a metal such as brass. The leaf spring 52 has a large elevation at the center and is nearly flat at the ends. This "sag" can best be seen in the side view of bridge actuator 10 as height "h". The preferred approach would be to pre-form the PLZT ribbon 51 and metal stamp the leaf spring 52 to the desired width, with the bonding to be performed later. To further increase translation length Δh, the PLZT ribbon 51 is electrically polled in the Z-direction and has a very large $d_{31}$ coefficient. A typical calculation for determining the translation length is therefore:

$$\Delta h = \frac{-(L-L_0)\Delta L}{4h}, \text{ where}$$

$$\Delta L = \sigma_{31}L = d_{31}EL, \text{ and}$$

$$L = 20 \text{ mm} \quad E = 10 \text{ kV/cm}$$

$$L_0 = 2 \text{ mm} \quad \Delta L = 8.3 \mu m \quad \Delta h = 20.7 m$$

$$h = 1.8 \text{ mm}$$

Figure 5A:
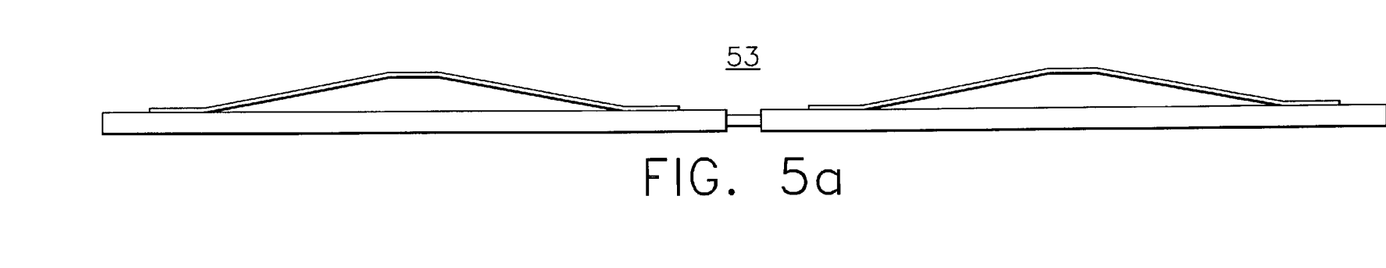
FIG. 5a is a side view of a double-span bridge actuator.
Figure 5B:
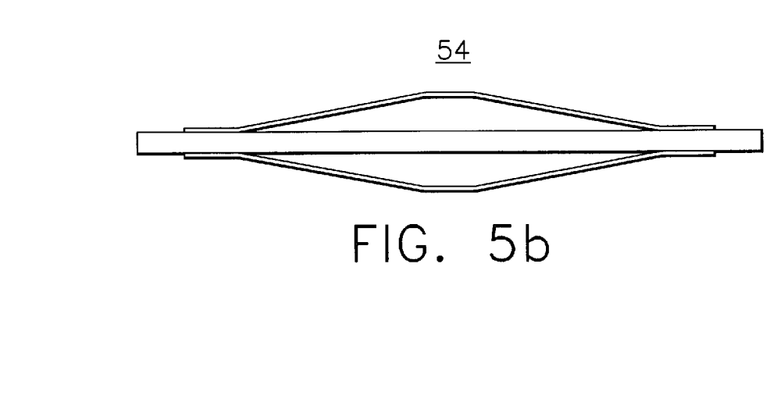
FIG. 5b is a side view of a double-sided bridge actuator.
Figure 5C:
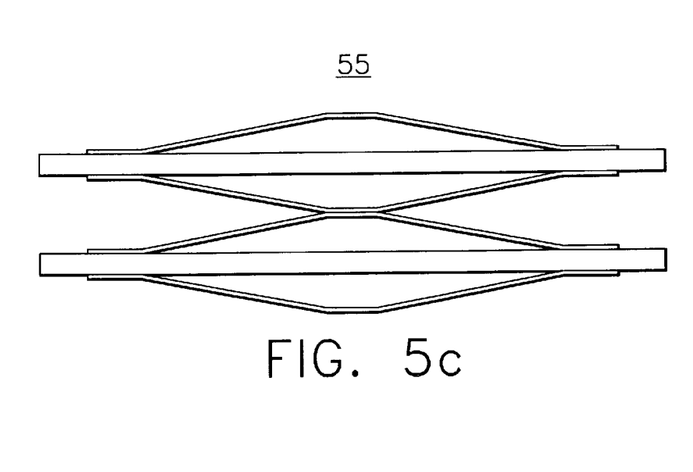
FIG. 5c is side view of a stacked double-sided bridge actuator.

The result of applying an electric field to PLZT ribbon 51 is therefore a tangential force that causes the leaf spring 52 to push the platform in the desired direction. Each such translator 30 (FIG. 2) of the preferred embodiment is therefore very compact, is nearly one-dimensional, and has a large translation length due to its inherent mechanical amplification. Up to 60× has been demonstrated for a single sided bridge and 120× for double-sided bridges. The translator 30 of the present invention has numerous applications and can be used in micro-optical scanners, optical communications, fiber optic systems or other optical systems requiring high accuracy beam pointing via light-weight translators. The bridge actuator design determines translation as a function of applied voltage. For example, stacked double-sided bridges 55, as shown in FIG. 5c, produce substantially higher translation distances at relatively lower voltages, when the individual piezoelectric bridges are biased in parallel. Similarly, double-sided bridges 54 as shown in FIG. 5b increase translation at a given applied voltage as compared with a single-sided bridge.

Returning to FIG. 2, it will be appreciated that additional actuators can be disposed adjacent to the first and second actuators 10 and 11 to serve the same purpose as spacers 12. Thus, instead of a single actuator physically contacting the optical element 20 on each side, two contact points will be provided on each side. FIG. 5a provides an example of such a dual function integrated into a single double-span bridge actuator 53. It will be appreciated that such a configuration would also allow heightened control over twist should such movement be desired.

It will further be appreciated that the preferred translator 30 can be readily modified to provide two-dimensional displacement by disposing the second bridge actuator along surfaces 32 or 33 of platform 31. Surfaces 32 and 33 would therefore be perpendicular to a second axis 200. Negative linear displacement along the first and second axes 100 and 200 can generally be provided by spring mechanisms discussed above.

Figure 3A:
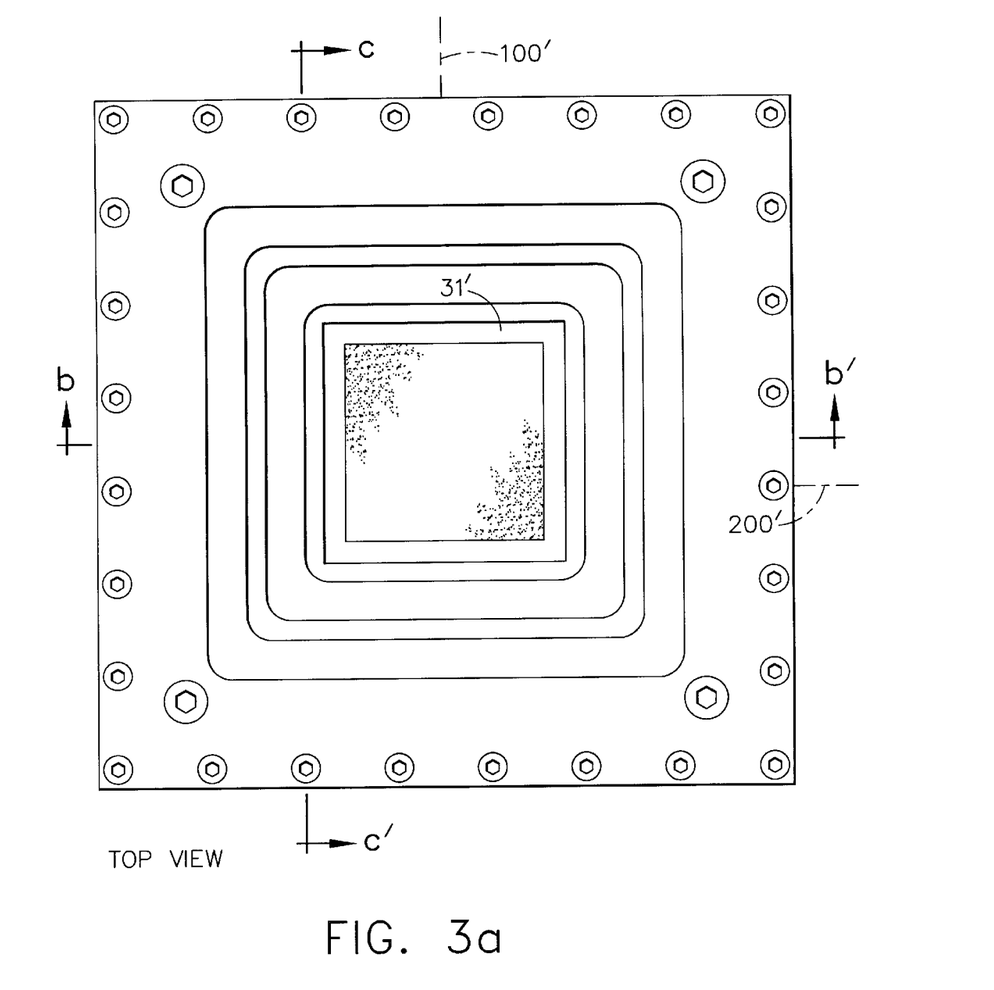
FIGS. 3a–c are top and sectional views of a two-stage piezoelectric translator for two micro-optic arrays in accordance with an alternative embodiment of the present invention.
Figure 3B:
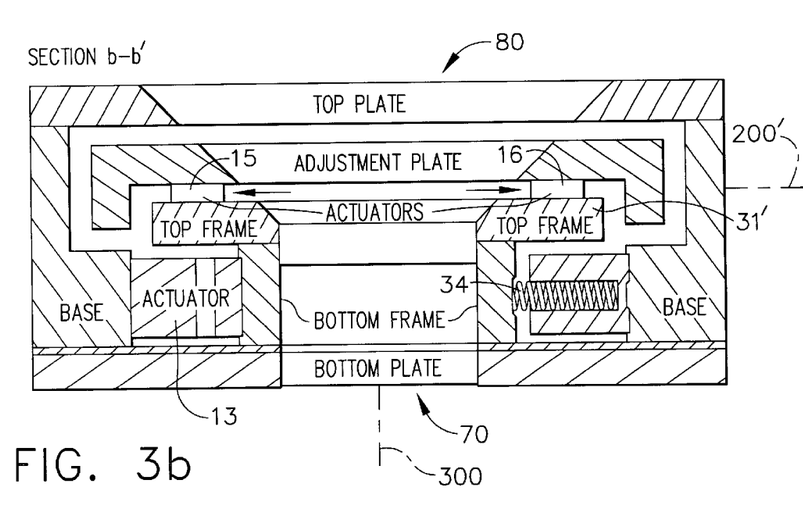
Figure 3C:
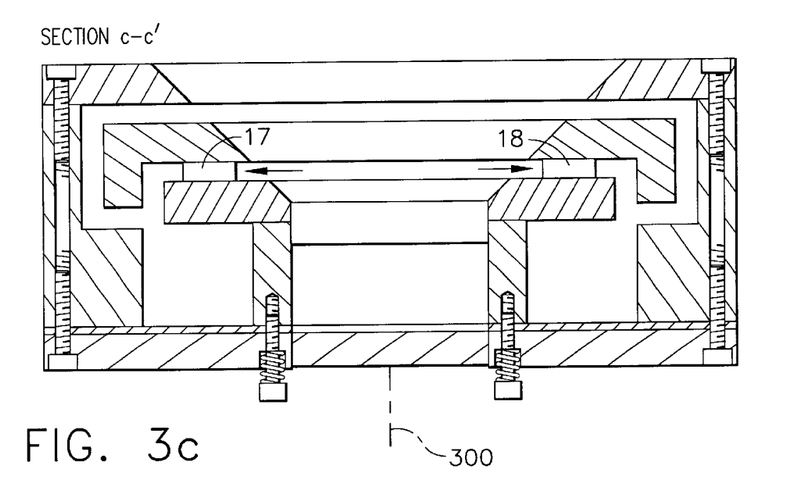

Another embodiment of the present invention additionally provides actuation in the Z-direction for two micro-optic arrays and is shown in FIGS. 3a–3c as third axis 300. Thus, it will be appreciated that the present invention can be readily adapted to provide three-dimensional actuation along first axis 100', second axis 200' and third axis 300. Platform 31' supports the micro-optic element which is stabilized by spring mechanism 34. Actuation along third axis 300 is provided by bridge actuator 13, whereas lateral actuation is provided by bridge actuators 15, 16, 17 and 18. First and second apertures 70 and 80 allow light to interact with the optical element 20.

Figure 6:
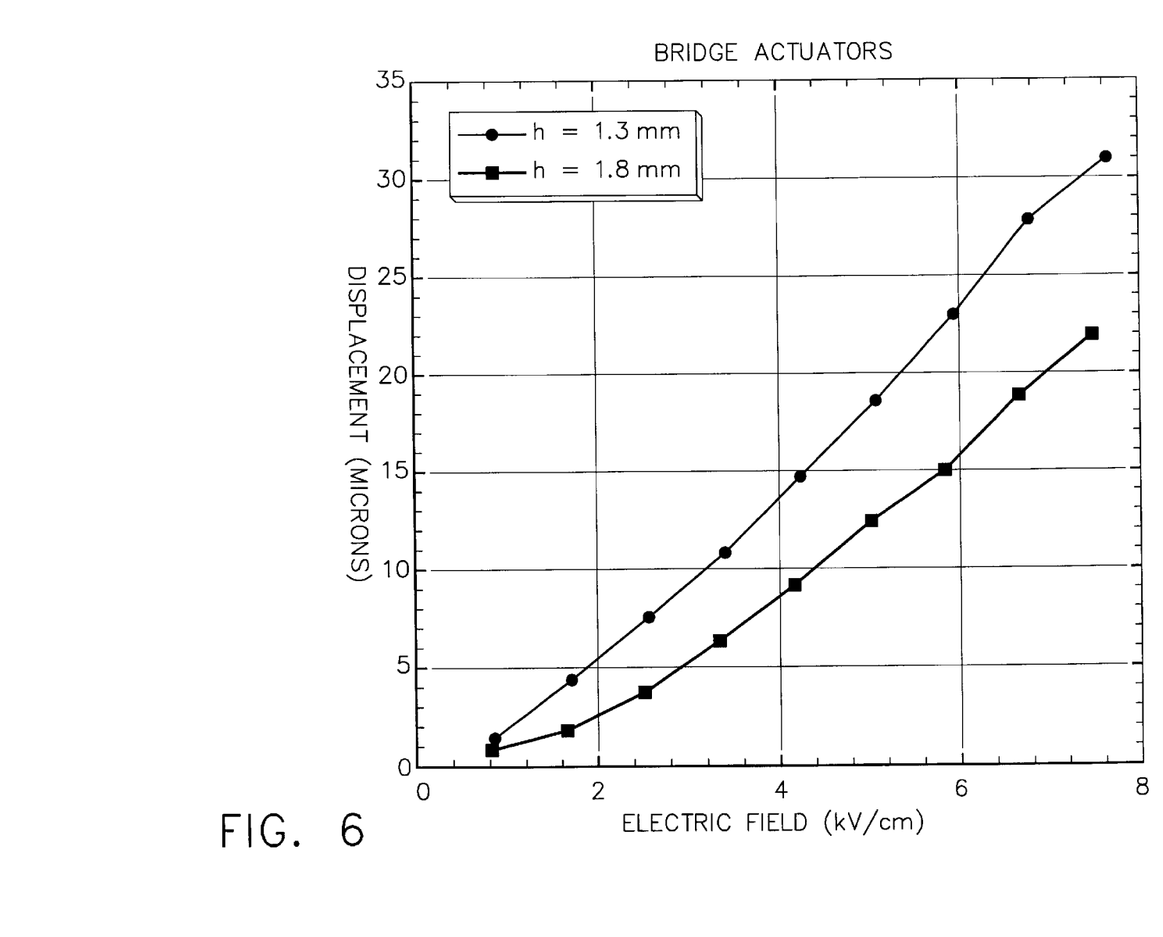
FIG. 6 is a plot of actuator displacement versus electric field for various actuator heights in accordance with the present invention.
Figure 7:
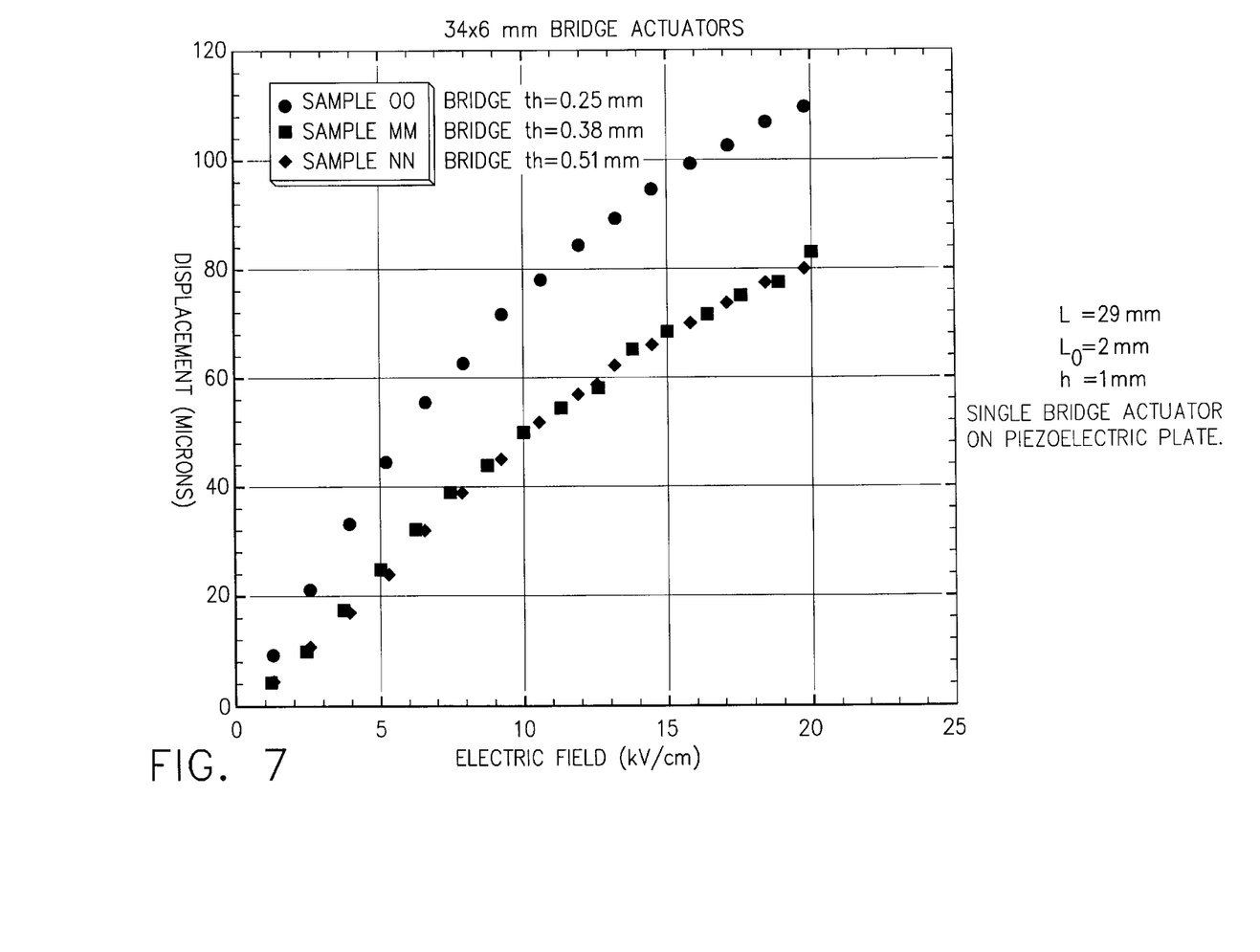
FIG. 7 is a plot of actuator displacement versus electric field for various bridge thicknesses in accordance with the present invention.
Figure 8:
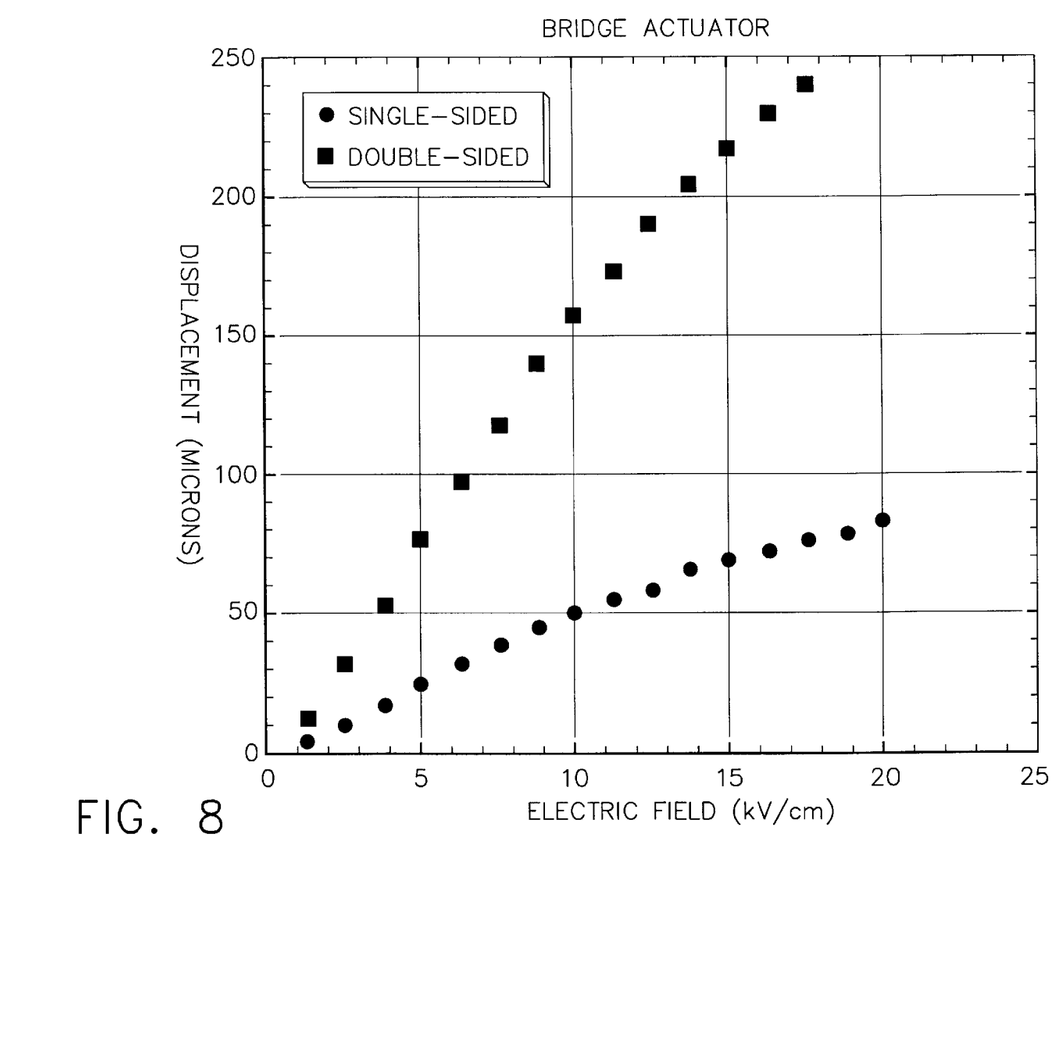
FIG. 8 is a plot of actuator displacement versus electric field for single- and double-sided actuators in accordance with the present invention.

Turning now to FIGS. 6–8, displacement results will be discussed in greater detail. Specifically, FIG. 6 is a plot of actuator displacement versus electric field for various actuator heights (h). It will be appreciated that smaller actuator heights have resulted, in an increase in displacement. FIG. 7 is a plot of various bridge leaf spring thicknesses. In accordance with the present invention, lower bridge thicknesses yield higher displacements. Finally, FIG. 8 shows the substantial difference in performance between a single-sided bridge actuator as shown in FIG. 4a, and a double-sided bridge actuator as shown in FIG. 5b, and demonstrates displacements as high as 250 microns.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A piezoelectric translator for translating lightweight optical elements, the translator comprising:

a platform supporting the optical element;

a piezo bridge actuation system for displacing the platform; and a position sensing system providing feedback to the actuation system regarding displacement of the platform.

2. The translator of claim 1 wherein the actuation system includes a plurality of single-sided bridge actuators.

3. The translator of claim 1 wherein the actuation system includes a plurality of double-sided bridge actuators.

4. The translator of claim 1 wherein the actuation system includes a plurality of stacked double-sided bridge actuators.

5. The translator of claim 1 wherein the actuation system includes a plurality of double-span bridge actuators.

6. The translator of claim 1 wherein the actuation system includes a plurality of bridge actuators, the actuation system displacing the platform along a first axis.

7. The translator of claim 6 wherein the plurality of bridge actuators comprises:

a first bridge actuator providing positive displacement along the first axis;

a second bridge actuator providing negative displacement along the first axis; and a system for aligning displacement of the optical element.

8. The translator of claim 7 wherein the system for aligning displacement includes a plurality of spacers disposed along a perimeter of the platform.

9. The translator of claim 7 wherein the system for aligning displacement provides micro-rotation control, the system for aligning displacement including:

a third bridge actuator disposed adjacent to the first bridge actuator; and a fourth bridge actuator disposed adjacent to the second bridge actuator.

10. The translator of claim 6 wherein the actuation system displaces the platform along a first axis and a second axis.

11. The translator of claim 10 wherein the plurality of bridge actuators includes:

a first bridge actuator providing positive displacement along the first axis;

a second bridge actuator providing negative displacement along the first axis;

a third bridge actuator providing positive displacement along the second axis; and a fourth bridge actuator providing negative displacement along the second axis.

12. The translator of claim 11 wherein the actuation system further displaces the platform along a third axis and the plurality of bridge actuators further includes:

a fifth bridge actuator providing positive displacement along the third axis; and a spring mechanism providing negative displacement along the third axis.

13. The translator of claim 1 further comprising a temperature controlled housing enclosing the optical element, the platform, and the actuation system, the housing having a first aperture allowing light to interact with the optical element.

14. The translator of claim 1 wherein the position sensing system includes one of:
- a capacitive sensing mechanism for sensing displacement of the platform; or
- an interferometric sensing mechanism for sensing fine displacement of the platform.

15. A method for translating an optical element comprising the steps of:
- supporting the optical element with a platform;
- displacing the platform with a piezo bridge actuation system; and
- providing feedback to the actuation system based on displacement of the platform.

16. The method of claim 15 further comprising the steps of:
- bonding a leaf spring cap to a piezoelectric ribbon, the cap and the ribbon forming a first bridge actuator in the form of a piezoelectric bridge;
- disposing the first bridge actuator along a perimeter of the platform; and
- actuating the first bridge actuator to provide positive linear displacement of the optical element along a first axis.

17. The method of claim 16 further comprising the steps of:
- bonding a leaf spring cap to a piezoelectric ribbon, the cap and the ribbon forming a second bridge actuator in the form of a piezoelectric bridge; and
- providing positive linear displacement of the optical element along a second axis with the second bridge actuator, the second bridge actuator disposed along the perimeter of the platform.

18. The method of claim 17 further comprising the steps of:
- bonding a leaf spring cap to a piezoelectric ribbon, the cap and the ribbon forming a third bridge actuator in the form of a piezoelectric bridge; and
- providing positive linear displacement of the micro-optic element along a third axis with the third bridge actuator, the third bridge actuator disposed along the perimeter of the platform.

* * * * *